United States Patent
Welles, II et al.

[11] Patent Number: 5,817,943
[45] Date of Patent: Oct. 6, 1998

[54] PRESSURE SENSORS

[75] Inventors: Kenneth Brakeley Welles, II, Scotia; Michael Paul Weir, Ballston Lake, both of N.Y.

[73] Assignee: General Electric Company, Schenectady, N.Y.

[21] Appl. No.: 823,261

[22] Filed: Mar. 24, 1997

[51] Int. Cl.$^6$ ................................................ G01L 9/12
[52] U.S. Cl. ............................ 73/718; 73/722; 73/724
[58] Field of Search ........................ 73/718, 724, 722, 73/728, 723, 862.61

[56] References Cited

U.S. PATENT DOCUMENTS

| | | | |
|---|---|---|---|
| 3,820,400 | 6/1974 | Rosso | 73/722 |
| 4,170,498 | 10/1979 | Jost et al. | 73/722 X |
| 4,192,183 | 3/1980 | Avellis et al. | 73/722 X |
| 4,192,191 | 3/1980 | Nelson | 73/722 X |
| 4,196,632 | 4/1980 | Sikorra | 73/718 |
| 4,281,666 | 8/1981 | Cosman | 73/722 X |
| 4,292,850 | 10/1981 | Bachem | 73/718 X |
| 4,523,474 | 6/1985 | Browne et al. | 73/724 |
| 4,559,829 | 12/1985 | Bianchi et al. | 73/722 X |
| 4,689,999 | 9/1987 | Shkedi | 73/718 X |
| 5,438,880 | 8/1995 | Washburn | 73/718 X |
| 5,485,748 | 1/1996 | Zeamer | 73/862.621 |
| 5,623,102 | 4/1997 | Arndt et al. | 73/718 |
| 5,641,911 | 6/1997 | Ryhanen | 73/718 |

Primary Examiner—Elizabeth L. Dougherty
Attorney, Agent, or Firm—Marvin Snyder; Douglas E. Stoner

[57] ABSTRACT

A pressure sensor having structure for generating a magnetic force to balance forces on opposing sides of a flexible diaphragm centered within a pressure chamber allows fluid pressure to be introduced into the chamber on one side of the diaphragm. A first magnetic coil is positioned on another side of the diaphragm and a second coil is mounted to the diaphragm. When fluid pressure is introduced into the pressure chamber, the diaphragm deflects, and the magnitude of current required to generate a recentering magnetic force which causes the diaphragm to be recentered constitutes a measure of the fluid pressure. Since the recentering magnetic force is substantially unaffected by temperature, the fluid pressure measurement obtained is substantially independent of temperature.

17 Claims, 4 Drawing Sheets

PRESSURE SENSORS

FIELD OF THE INVENTION

This invention relates generally to pressure sensors and, more particularly, to pressure sensors having low sensitivity to ambient temperature.

BACKGROUND OF THE INVENTION

Pressure sensors are used in a wide variety of applications and in many different environments. For example, pressure sensors are used in automobiles to sense fluid pressures. Such fluid pressures indicate whether the automobile is operating properly. The temperature conditions in an automobile can vary, and such varying temperature conditions increase the difficulty in obtaining accurate, temperature independent measurements of fluid pressure.

Pressure sensors measure strain or displacement of an element, usually a diaphragm, acted on by the fluid pressure being measured. The restoring force on the diaphragm is the elastic modulus of the diaphragm material. Because the diaphragm elastic modulus varies with temperature, the accuracy of pressure measurements made using the diaphragm also varies with temperature. Known pressure sensors which are substantially unaffected by temperature are complex and expensive to manufacture, in terms of both material and labor.

It would be desirable to provide a pressure sensor which generates an accurate measure of pressure in an environment having a wide range of temperature conditions. It also would be desirable for such pressure sensor to be simple and reliable, yet inexpensive to manufacture, in terms of both material and labor.

SUMMARY OF THE INVENTION

One embodiment of a pressure sensor in accordance with the present invention includes structure for generating a magnetic force to balance forces on opposing sides of a flexible diaphragm centered within a pressure chamber. A first conductive coil is positioned within the pressure chamber and a second coil is mounted to the diaphragm. The second coil is connected to a fixed current source. When fluid pressure is introduced into the pressure chamber on one side of the diaphragm, the diaphragm deflects toward the first coil. Current is then established in the first coil in a direction opposite the direction of current in the second coil. The magnetic fields of the first and second coils therefore repel, and the magnitude of current in the first coil required to generate a recentering magnetic force to recenter the diaphragm is representative of the fluid pressure on the one side of the diaphragm. Therefore, by measuring the current in the first coil, the fluid pressure can be determined. Since the recentering magnetic force is substantially unaffected by temperature, the fluid pressure measurement obtained using the above described sensor is substantially independent of temperature. Therefore, the sensor is accurate over a wide range of temperatures. Further, such sensor is economical in terms of both material and labor costs.

BRIEF DESCRIPTION OF THE DRAWINGS

FIGS. 1b and 1c are side and top views, respectively, of the pressure sensor shown in FIG. 1a.

FIG. 3 is a circuit schematic of one embodiment of a control and measuring circuit used in connection with the pressure sensor shown in FIG. 1a.

FIG. 4 is a circuit schematic of an alternative control and measuring circuit which can be used in place of a portion of the circuit illustrated in FIG. 3.

FIG. 5 is a circuit schematic of another embodiment of a control and measuring circuit used in connection with the pressure sensor shown in FIG. 1a.

DETAILED DESCRIPTION OF THE DRAWINGS

Figure 1A:
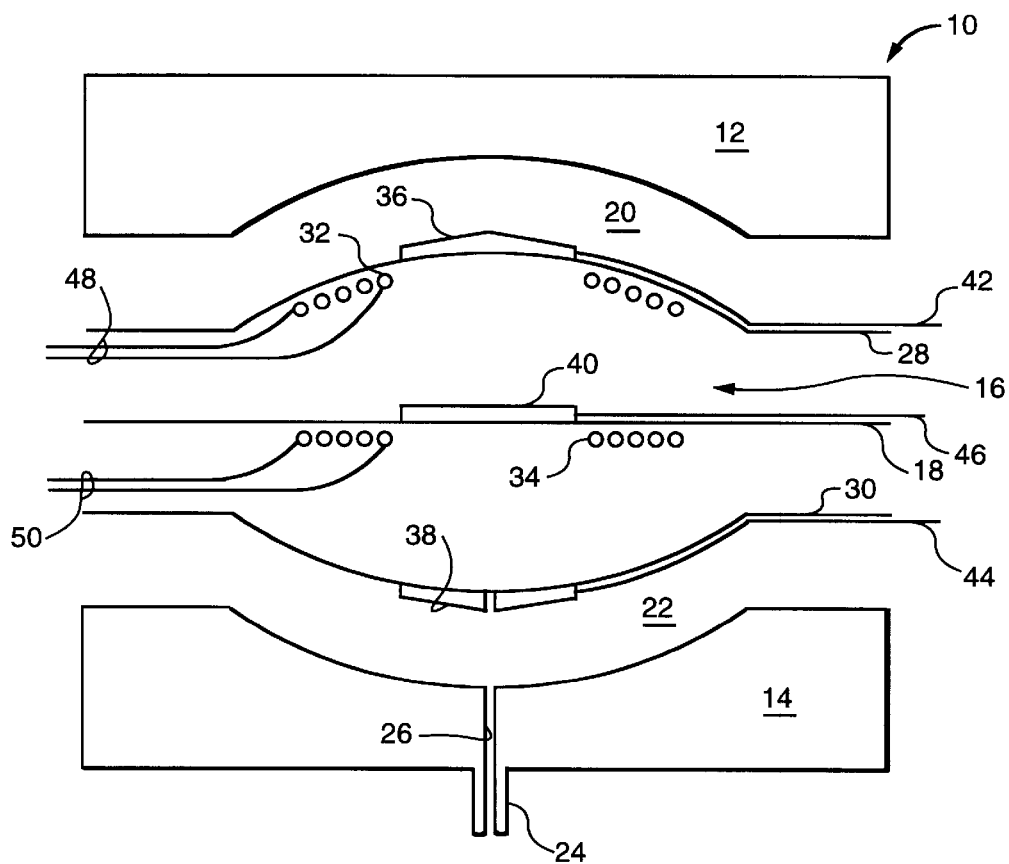
FIG. 1a is an exploded cross sectional view of one embodiment of a pressure sensor in accordance with the present invention.

As shown in FIG. 1a, a pressure sensor 10 includes upper and lower dies 12 and 14 which define a pressure chamber 16 therebetween. A flexible diaphragm 18 is positioned within, and extends through, chamber 16. A first chamber section 20 and a second chamber section 22 are separated by diaphragm 18. Diaphragm 18 may, for example, be comprised of a polyimide material. An inlet port 24 formed in lower die 14 is connectable to be in flow communication with an external source of fluid pressure (not shown). Specifically, a flow channel 26 extends through lower die 14 from inlet port 24 to second chamber section 22.

Sensor 10 also includes an upper electric circuit 28 positioned within first chamber section 20, and a lower electric circuit 30 positioned within second chamber section 22. Upper electric circuit 28 and lower electric circuit 30 are substantially equidistant from diaphragm 18 when pressures on either side of diaphragm 18 are equal. Upper and lower circuits 28 and 30 may be formed on a polyimide film such as Kapton (Kapton is a trademark of E. I. du Pont de Nemours and Company, Wilmington, Del.). Such film is copper clad and the electric circuits described below for upper and lower circuits 28 and 30 are photo etched onto respective films. The film for each circuit 28 and 30 is adhesively secured to the wall of respective chamber sections 20 and 22 using an adhesive such as a methylmethacrylate adhesive. It is contemplated that upper and lower circuits 28 and 30 can be formed of alternative materials and located within respective chamber sections 20 and 22 using alternative techniques. Circuit components may be mounted to diaphragm 18 using a methylmethacrylate adhesive or by copper cladding and photo etching.

Upper electric circuit 28 includes a first coil 32, and a second coil 34 mounted to diaphragm 18. Second coil 34 is electrically connected to a fixed current source (214 in FIG. 5, not shown in FIG. 1a). Upper circuit 28 further includes a first capacitor plate 36 and lower circuit 30 includes a second capacitor plate 38. A third capacitor plate 40 is mounted to diaphragm 18. A high frequency AC source (102 in FIG. 3, not shown in FIG. 1a) is electrically connected to third capacitor plate 40. Leads 42, 44 and 46 are electrically connected to first, second and third capacitor plates 36, 38 and 40, respectively, and leads 48 and 50 are electrically connected to first and second coils 32 and 34, respectively. It is contemplated that first and third capacitor plates 36 and 40 could be incorporated into first and second coils 32 and 34, respectively, to reduce the number of wires extending into pressure chamber 16. Such incorporation, or integration, however, may place other constraints on frequency and conversion method selection.

Figure 1B:
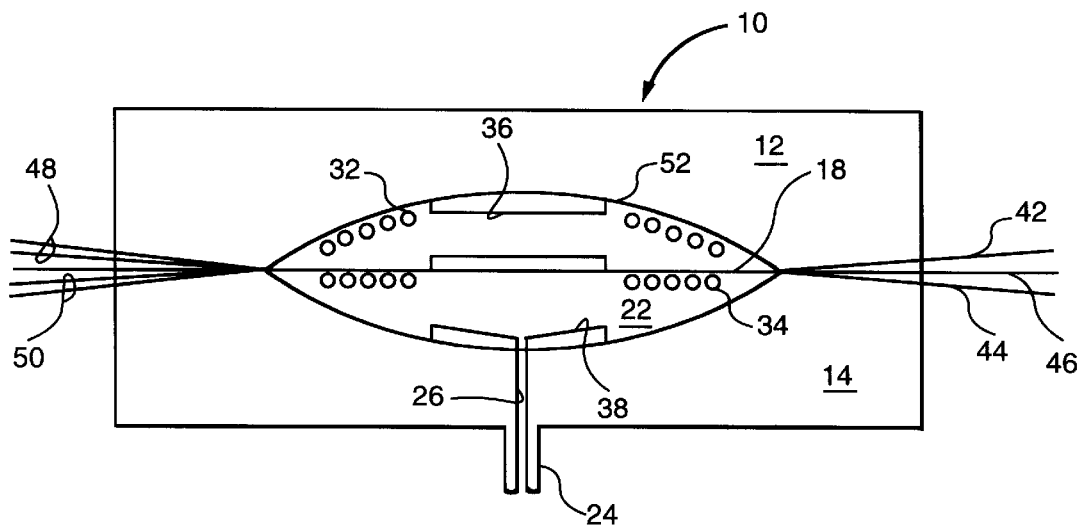

As shown in FIG. 1b, upper coil 32 is substantially positioned against a wall 52 of upper die 12. Upper coil 32 therefore is not displaced by fluid pressure which enters into chamber 16 through inlet port 24. Diaphragm 18, as explained above, extends through chamber 16 and separates first and second chamber sections 20 and 22. Therefore, pressure introduced into chamber 16 through port 24 causes diaphragm 18 to deflect.

Figure 1C:
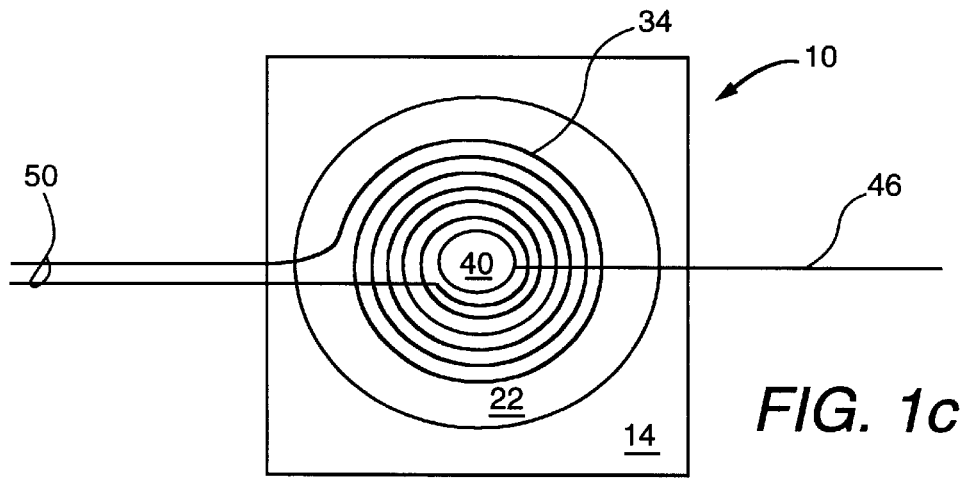

FIG. 1c illustrates diaphragm 18 and second coil 34. Second coil 34 is a spiral type coil and is electrically separated and insulated from third capacitor plate 40 by diaphragm 18.

Figure 2A:
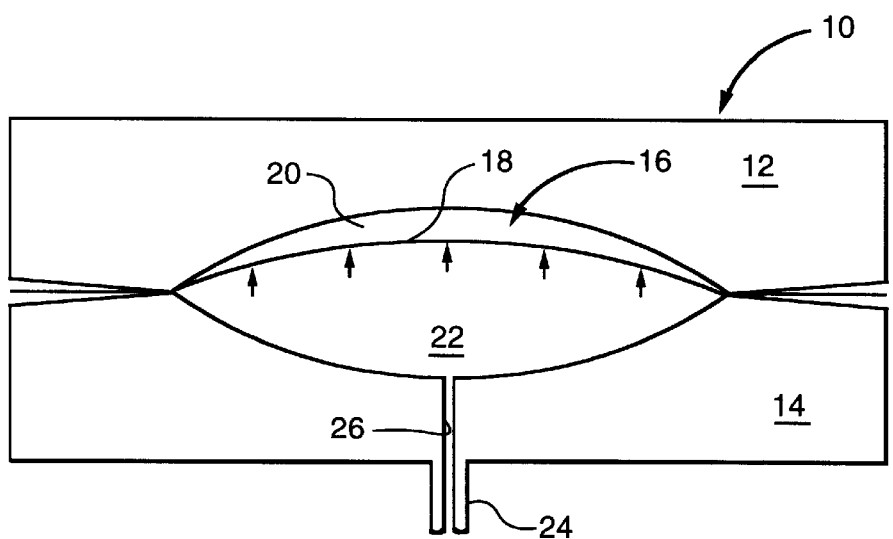
FIG. 2a is schematic side view of the pressure sensor shown in FIG. 1a with force being exerted against the flexible diaphragm.

FIG. 2a illustrates pressure sensor 10 with force exerted against flexible diaphragm 18. Specifically, fluid (gas or liquid) enters chamber section 22 through port 24 and exerts force against diaphragm 18, causing diaphragm 18 to deflect as shown.

Figure 2B:
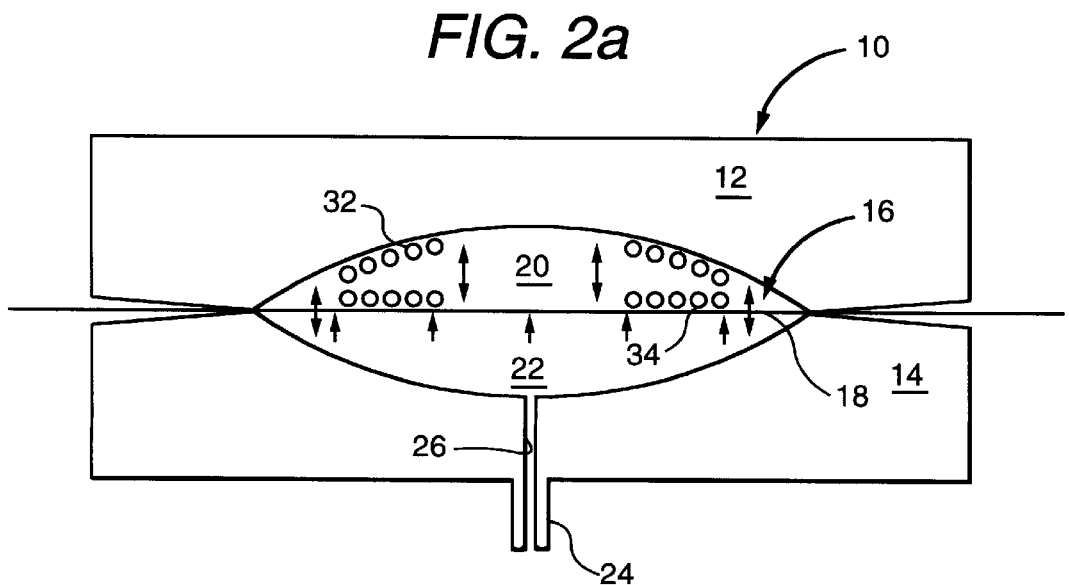
FIG. 2b is a schematic side view of the pressure sensor shown in FIG. 2a with the diaphragm recentered due to repelling magnetic forces.

Once diaphragm 18 deflects as shown in FIG. 2a, current is established in upper coil 32, and magnetic fields from upper coil 32 and coil 34 interact to generate a recentering magnetic force. The recentering magnetic force, as shown in FIG. 2b, recenters diaphragm 18 in the presence of the fluid pressure. The magnitude of current flow through first coil 32 when diaphragm 18 recenters is then representative of (or a measure of) the fluid pressure being exerted against diaphragm 18. Since the repelling magnetic force is substantially unaffected by temperature, the fluid pressure measurement obtained by measuring such current magnitude is substantially independent of temperature.

Figures 3, 4:
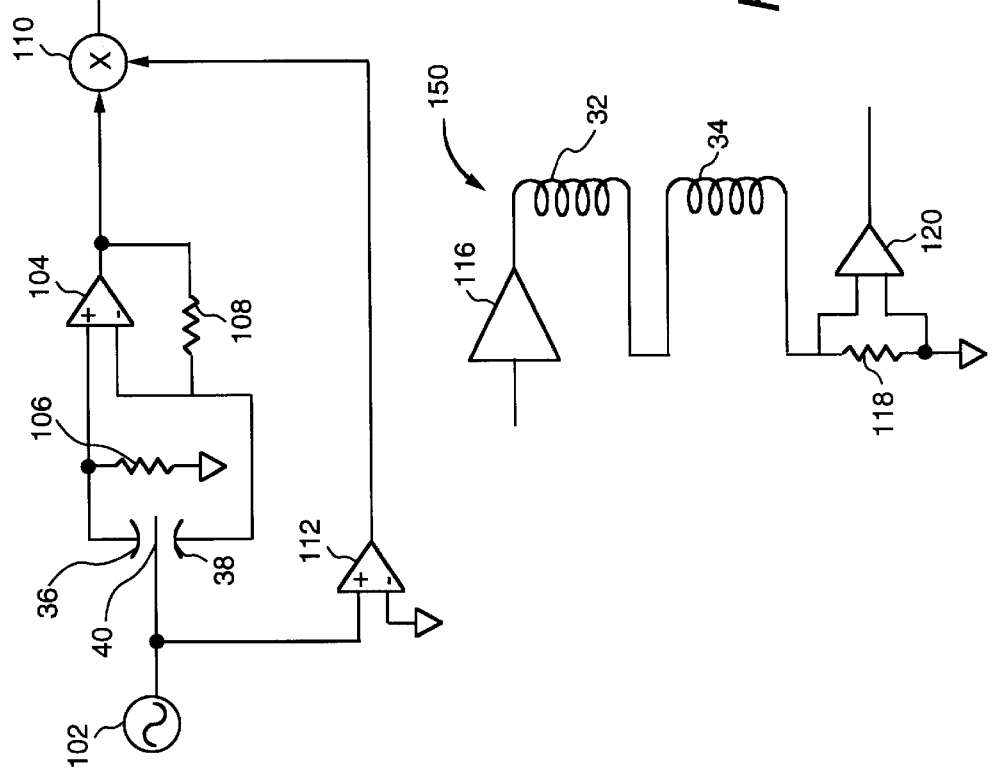

FIG. 3 is a circuit schematic of one embodiment of a control and measuring apparatus, or circuit, 100 which may be used in connection with pressure sensor 10. Third capacitor plate 40 is electrically connected to a high frequency AC source 102. First capacitor plate 36 is electrically connected to a positive "+" input of a differential amplifier 104, and second capacitor plate 38 is electrically connected to a negative "−" input of differential amplifier 104. A resistor 106 is connected across first capacitor plate 36 and ground, and a feedback resistor 108 is connected between the output of amplifier 104 and the amplifier negative input. A synchronous rectifier 110 is electrically connected to an output of differential amplifier 104. Synchronous rectifier 110 also is coupled to high frequency AC source 102 through a comparator 112. A low pass filter 114 is electrically connected to an output of synchronous rectifier 110. A current amplifier 116 is electrically connected to an output of synchronous rectifier 114, and an output of current amplifier 116 is electrically connected to first coil 32. A current measuring resistor 118 is electrically connected in series with first coil 32. An amplifier 120 is electrically connected across current measuring resistor 118. A fixed current source 122 is connected in series with second coil 34.

In operation, pressure is initially equal on each side of diaphragm 18 in pressure chamber 16. Under such conditions, first and second capacitor plates 36 and 38 are equidistant from third capacitor plate 40. Therefore, the charges developed on first and second capacitor plates 36 and 38 are substantially equal. As a result, no output signal is developed by differential amplifier 104, and synchronous rectifier 110 provides no signal to low pass filter 114, so that no current flow is established in first coil 32. Under such conditions, there also is no current in current measuring resistor 118 and no output signal is produced by amplifier 120 connected across current measuring resistor 118.

When fluid pressure is introduced into pressure chamber 16 through pressure chamber port 24, however, diaphragm 18 is displaced, displacing third capacitor plate 40. As a result, the distance between third capacitor plate 40 and first capacitor plate 36 is less than the distance between third capacitor plate 40 and second capacitor plate 38. Consequently, the charge developed on first capacitor plate 36 is greater than the charge developed on second capacitor plate 38. Therefore an AC signal with the same phase as AC source 102 and with amplitude proportional to the difference between the first and second capacitor plate charges is produced by differential amplifier 104.

Synchronous rectifier 110 rectifies this AC signal, and low pass filter 114 produces a DC signal representative of the capacitor plate charge imbalance. The lowpass filtered DC signal output, amplified by current amplifier 116, is provided to first coil 32. Current in first coil 32 produces a magnetic field which interacts with the magnetic field of second coil 34. Since current in first coil 32 is in a reverse direction compared to that in second coil 34, the magnetic fields repel and, when sufficiently strong, the magnetic field of first coil 32 recenters diaphragm 18 within pressure chamber 16. When diaphragm 18 is fully recentered, the output signal of amplifier 120 connected across current measuring resistor 118 is representative of the pressure within pressure chamber 16. The pressure representative signal generated by pressure sensor 10 described above is substantially independent of temperature.

FIG. 4 is a circuit schematic of a section of an alternative control and measuring circuit 150 which can be used in place of a section of circuit 100 illustrated in FIG. 3. Specifically, circuit 150 is identical to circuit 100 up to and including current amplifier 116. In circuit 150, however, first coil 32 is electrically connected in series with second coil 34. Current measuring resistor 118 also is electrically connected in series with second coil 34, and amplifier 120 is electrically connected across current measuring resistor 118.

In circuit 150, the square of the current magnitude sensed at current measuring resistor 118 is proportional to the applied pressure in the sensor pressure chamber. That is, the output pressure signal from amplifier 120 is a voltage proportional to the square root of the applied pressure. This non-linear output signal may be highly desirable in some applications because it provides a wider dynamic range of pressure measurement and yet provides the same resolution of voltage measurement.

Figure 5:
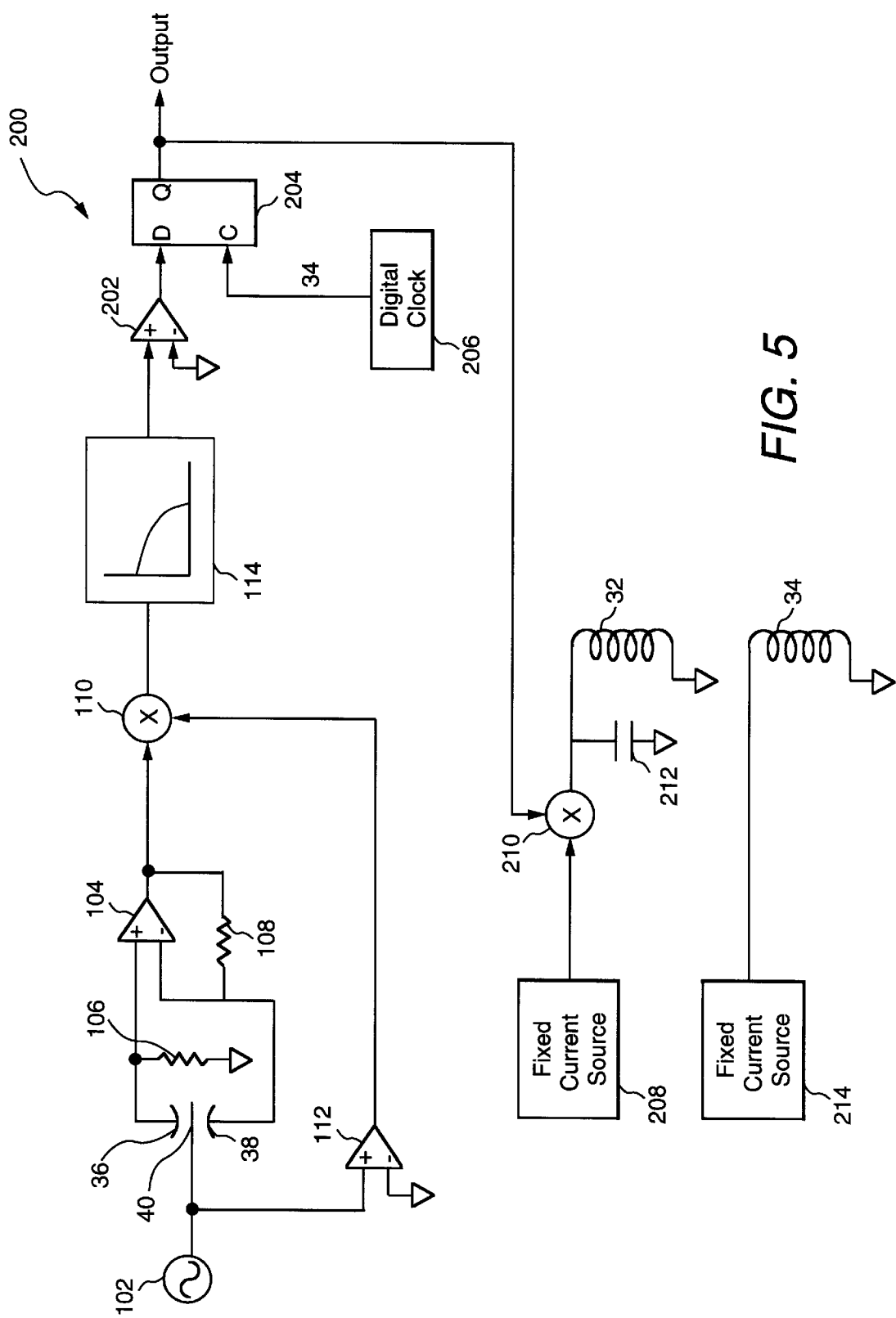

FIG. 5 is a circuit schematic of another embodiment of a control and measuring circuit 200 which may be used in connection with the pressure sensor of the invention. Components of circuit 200 which are identical to components of circuit 100 illustrated in FIG. 3 are indicated by identical reference numerals. In circuit 200, a comparator 202 is coupled to an output of low pass filter 114, and the "D" input of a flip-flop 204 is coupled to an output of comparator 202. The "C" input of flip-flop 204 is coupled to a digital clock 206.

A fixed current source 208 is coupled in series with an electronically controlled switch 210, and first coil 32 is coupled in series with switch 210. A capacitor 212 is coupled across first coil 32. Switch 210 has a closed or current conducting condition and an open or current interrupting condition, controlled by the state of the "Q" output of flip-flop 204. Another fixed current source 214 is coupled in series with second coil 34.

In operation, the output signal of low pass filter 114 is compared to zero by comparator 202, and the result of such comparison sets or resets flip-flop 204 at every digitizing clock pulse. When flip-flop 204 is switched to the set condition, switch 210 is turned on for one clock period, allowing a fixed current to flow to capacitor 212 and first coil 32. When flip-flop 204 is switched to the reset condition, no current flows in switch 210. The resultant signal is a series of clock periods during which the current supplied to first coil 32 is on or off, or alternating between on and off at some duty cycle. The duty cycle of the raw digital bit stream is therefore proportional to the number of fixed charge packets, i.e., the fixed current pulses in coil 32. Such configuration is similar to well known delta-sigma oversampling analog-to-digital converters, with the exception that in circuit 200, the delta-sigma loop is closed by magnetic force, mechanical travel and capacitor balance, rather than by simple electronic feedback. The integration function of a delta-sigma modulator is performed in circuit 200 by the motion of the pressure sensor diaphragm integrating the applied force imbalance between the magnetic repulsion and the fluid pressure. By incorporating all of these functions in the loop, circuit 200 provides simple and accurate pressure data. A digital decimation or low pass filter may be applied to the raw digital bit stream (i.e., at the Q output of flip-flop 204) and tailored to the resolution and data rate desired.

The above described pressure sensor embodiments provide the advantage that almost all temperature error mechanisms associated with strain gauge based pressure sensors are eliminated. Remaining temperature effects include, but are not limited to, dimensional expansion of the pressure cavity with temperature, and temperature based offset errors and gain changes in the electronic components. Since the voltage levels generated by the above described sensors are much greater than those of strain gauge based pressure sensors, temperature errors associated with the electronic components are much easier to correct in the present invention.

While only certain preferred features of the invention have been illustrated and described, many modifications and changes will occur to those skilled in the art. It is, therefore, to be understood that the appended claims are intended to cover all such modifications and changes as fall within the true spirit of the invention.

What is claimed is:

1. A pressure sensor, comprising:
   a pressure chamber;
   a diaphragm positioned within said chamber and separating said chamber into first and second chamber sections;
   a first circuit positioned within said first chamber section and comprising a first capacitor plate and a first coil;
   a second circuit positioned within said second chamber section and comprising a second capacitor plate;
   a second coil mounted to said diaphragm; and
   a third capacitor plate mounted to said diaphragm, said first and second capacitor plates being substantially equidistant from said third capacitor plate when no pressure differential is present across said diaphragm.

2. A pressure sensor in accordance with claim 1 and further comprising apparatus for determining relative capacitance between said first and third capacitor plates and said second and third capacitor plates.

3. A pressure sensor in accordance with claim 2 wherein said apparatus is adapted to control current in said first coil based on the determined relative capacitance.

4. A pressure sensor in accordance with claim 1 and further comprising a differential amplifier having a positive input and a negative input, said first capacitor plate being coupled to said positive input of said differential amplifier and said second capacitor plate being coupled to said negative input of said differential amplifier, and further comprising a synchronous rectifier coupled to an output of said comparator.

5. A pressure sensor in accordance with claim 4 and further comprising a current amplifier, and a low pass filter coupling the output of said synchronous rectifier to an input of said current amplifier.

6. A pressure sensor in accordance with claim 5 wherein said first coil is coupled to an output of said current amplifier, and said pressure sensor further comprises a current measuring resistor coupled in series with said first coil, and further including a fixed current source coupled in series with said second coil.

7. A pressure sensor in accordance with claim 6 and further comprising an amplifier coupled across said current measuring resistor for producing an output signal representative of pressure applied to said pressure chamber.

8. A pressure sensor in accordance with claim 5 wherein said first coil is coupled to an output of said current amplifier, said second coil is coupled in series with said first coil, and said sensor further comprises a current measuring resistor coupled in series with said second coil.

9. A pressure sensor in accordance with claim 8 and further comprising an amplifier coupled across said current measuring resistor for producing an output signal representative of pressure applied to said pressure chamber.

10. A pressure sensor in accordance with claim 5 and further comprising a comparator coupled to an output of said low pass filter, and a flip-flop coupled to an output of said comparator.

11. A pressure sensor in accordance with claim 10 and further comprising a fixed current source, and an electronically controlled switch coupled in series with an output of said fixed current source, said first coil being coupled in series with said switch, said switch being operable to a current conducting or current interrupting condition in response to signals from said flip-flop.

12. A pressure sensor in accordance with claim 11 and further comprising a fixed current source coupled in series with said second coil.

13. A pressure sensor, comprising:
    a pressure chamber;
    a diaphragm positioned within said chamber and separating said chamber into first and second chamber sections;
    a first coil located in said first chamber section;
    a second coil mounted to said diaphragm;
    a first capacitor plate located in said first chamber section;
    a second capacitor plate located in said second chamber section; and
    a third capacitor plate mounted to said diaphragm.

14. A pressure sensor in accordance with claim 13 and further comprising a differential amplifier having a positive input and a negative input, said first capacitor plate being coupled to said positive input of said differential amplifier and said second capacitor plate being coupled to the negative input of said differential amplifier, a synchronous rectifier coupled to an output of said differential amplifier, and a low pass filter coupled to an output of said synchronous rectifier.

15. A pressure sensor in accordance with claim 14 and further comprising a current amplifier coupled to an output of said synchronous rectifier, said first coil being coupled to an output of said current amplifier, said pressure sensor further comprising a current measuring resistor coupled in series with said first coil, and an amplifier coupled across said current measuring resistor for producing an output signal representative of pressure applied to said pressure chamber.

16. A pressure sensor in accordance with claim 14 wherein said first coil is coupled to an output of said current amplifier and said second coil is coupled in series with said first coil, said sensor further comprising a current measuring resistor coupled in series with said second coil, and an amplifier coupled across said current measuring resistor for producing an output signal representative of pressure applied to said pressure chamber.

17. A pressure sensor in accordance with claim 14 and further comprising a comparator coupled to an output of said low pass filter, a flip-flop coupled to an output of said comparator, a first fixed current source, an electronically controlled switch coupled in series with an output of said fixed current source, said first coil being coupled in series with said switch, said switch being operable to a current conducting condition or current interrupting condition in response to signals from said flip flop, and a second fixed current source coupled in series with said second coil.

* * * * *